US 8,224,985 B2
Jul. 17, 2012

(12) United States Patent
Takeda

(54) PEER-TO-PEER COMMUNICATION TRAVERSING SYMMETRIC NETWORK ADDRESS TRANSLATORS

(75) Inventor: Yutaka Takeda, San Mateo, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 994 days.

This patent is subject to a terminal disclaimer.

(21) Appl. No.: 11/243,853

(22) Filed: Oct. 4, 2005

(65) Prior Publication Data

US 2007/0076729 A1    Apr. 5, 2007

(51) Int. Cl.
*G06F 15/16* (2006.01)
*G06F 15/173* (2006.01)
*G06F 15/177* (2006.01)

(52) U.S. Cl. .......................... 709/237; 709/223; 709/230

(58) Field of Classification Search .................. 709/203, 709/223, 236, 237, 230
See application file for complete search history.

(56) References Cited

U.S. PATENT DOCUMENTS

| 4,764,928 A | 8/1988 | Akerberg |
| 4,787,051 A | 11/1988 | Olson |
| 4,843,568 A | 6/1989 | Krueger |
| 5,128,671 A | 7/1992 | Thomas, Jr. |
| 5,528,265 A | 6/1996 | Harrison |
| 5,544,325 A | 8/1996 | Denny et al. |
| 5,596,720 A | 1/1997 | Hamada et al. |
| 5,630,184 A | 5/1997 | Roper et al. |
| 5,636,216 A | 6/1997 | Fox et al. |
| 5,701,427 A | 12/1997 | Lathrop |
| 5,768,382 A | 6/1998 | Schneier et al. |
| 5,768,531 A | 6/1998 | Lin |
| 5,793,763 A | 8/1998 | Mayes et al. |
| 5,809,016 A | 9/1998 | Kreitzer et al. |
| 5,812,531 A | 9/1998 | Cheung et al. |

(Continued)

FOREIGN PATENT DOCUMENTS

EP    0 913 965    5/1999

(Continued)

OTHER PUBLICATIONS

J. Rosenberg, Interactive Connectivity Establishment (ICE) : A Methodology for Network Address Translator (NAT) Traversal for Multimedia Session Establishment Protocols, Jul. 19, 2004, retrieved from http://tools.ietf.org/id/draft-ietf-mmusic-ice-02.txt).*

(Continued)

*Primary Examiner* — Haresh N Patel
*Assistant Examiner* — Chau Le
(74) *Attorney, Agent, or Firm* — Joshua D. Isenberg; JDI Patent

(57) ABSTRACT

Disclosed are systems and methods for peer-to-peer communication over a network between a first node behind a first network address translator (NAT) and a second node behind a second NAT, despite the first NAT and the second NAT intervening between the first and second nodes. The first NAT is a Symmetric NAT. A port prediction is performed wherein the first node constructs a list of predicted transport addresses on the first NAT. A message containing the list of predicted transport addresses is sent from the first node to the second node. A connectivity check is performed with the second node using the predicted transport addresses.

40 Claims, 3 Drawing Sheets

U.S. PATENT DOCUMENTS

| | | | |
|---|---|---|---|
| 5,835,726 A | 11/1998 | Shwed et al. | |
| 5,856,972 A | 1/1999 | Riley et al. | |
| 5,898,679 A | 4/1999 | Brederveld et al. | |
| 5,956,485 A | 9/1999 | Perlman | |
| 6,012,096 A | 1/2000 | Link et al. | |
| 6,058,431 A | 5/2000 | Srisuresh et al. | |
| 6,128,623 A | 10/2000 | Mattis et al. | |
| 6,128,624 A | 10/2000 | Papierniak et al. | |
| 6,128,627 A | 10/2000 | Mattis et al. | |
| 6,128,664 A | 10/2000 | Yanagidate et al. | |
| 6,151,584 A | 11/2000 | Papierniak et al. | |
| 6,151,601 A | 11/2000 | Papierniak et al. | |
| 6,152,824 A | 11/2000 | Rothschild et al. | |
| 6,157,368 A | 12/2000 | Fager | |
| 6,208,649 B1 | 3/2001 | Kloth | |
| 6,209,003 B1 | 3/2001 | Mattis et al. | |
| 6,212,565 B1 | 4/2001 | Gupta | |
| 6,212,633 B1 | 4/2001 | Levy et al. | |
| 6,289,358 B1 | 9/2001 | Mattis et al. | |
| 6,292,880 B1 | 9/2001 | Mattis et al. | |
| 6,327,630 B1 | 12/2001 | Carroll et al. | |
| 6,333,931 B1 | 12/2001 | LaPier et al. | |
| 6,349,210 B1 | 2/2002 | Li | |
| 6,353,891 B1 | 3/2002 | Borella et al. | |
| 6,375,572 B1 | 4/2002 | Masuyama | |
| 6,389,462 B1 | 5/2002 | Cohen et al. | |
| 6,393,488 B1 | 5/2002 | Araujo | |
| 6,405,104 B1 | 6/2002 | Dougherty | |
| 6,421,347 B1 | 7/2002 | Borgstahl et al. | |
| 6,487,583 B1 | 11/2002 | Harvey et al. | |
| 6,487,600 B1 | 11/2002 | Lynch | |
| 6,535,511 B1 | 3/2003 | Rao | |
| 6,549,786 B2 | 4/2003 | Cheung et al. | |
| 6,553,515 B1 | 4/2003 | Gross et al. | |
| 6,581,108 B1 | 6/2003 | Denison et al. | |
| 6,590,865 B1 | 7/2003 | Ibaraki et al. | |
| 6,616,531 B1 | 9/2003 | Mullins | |
| 6,618,757 B1 | 9/2003 | Babbitt et al. | |
| 6,636,898 B1 | 10/2003 | Ludovici et al. | |
| 6,640,241 B1 | 10/2003 | Ozzie et al. | |
| 6,641,481 B1 | 11/2003 | Mai et al. | |
| 6,661,799 B1 * | 12/2003 | Molitor | 370/401 |
| 6,667,972 B1 | 12/2003 | Foltan et al. | |
| 6,668,283 B1 | 12/2003 | Sitaraman et al. | |
| 6,701,344 B1 | 3/2004 | Holt et al. | |
| 6,704,574 B2 | 3/2004 | Lin | |
| 6,712,697 B2 | 3/2004 | Acres | |
| 6,772,219 B1 | 8/2004 | Shobatake | |
| 6,779,017 B1 | 8/2004 | Lamberton et al. | |
| 6,779,035 B1 | 8/2004 | Gbadegesin | |
| 6,789,126 B1 | 9/2004 | Saulpaugh et al. | |
| 6,799,255 B1 | 9/2004 | Blumenau et al. | |
| 6,807,575 B1 | 10/2004 | Emaru et al. | |
| 6,816,703 B1 | 11/2004 | Wood et al. | |
| 6,829,634 B1 | 12/2004 | Holt et al. | |
| 6,848,997 B1 | 2/2005 | Hashimoto et al. | |
| 6,891,801 B1 | 5/2005 | Herzog | |
| 6,899,628 B2 | 5/2005 | Leen et al. | |
| 6,920,501 B2 | 7/2005 | Chu et al. | |
| 6,978,294 B1 | 12/2005 | Adams et al. | |
| 7,016,942 B1 | 3/2006 | Odom | |
| 7,017,138 B2 | 3/2006 | Zirojevic et al. | |
| 7,035,911 B2 | 4/2006 | Lowery et al. | |
| 7,043,641 B1 | 5/2006 | Martinek et al. | |
| 7,065,579 B2 | 6/2006 | Traversat et al. | |
| 7,082,316 B2 | 7/2006 | Eiden et al. | |
| 7,096,006 B2 | 8/2006 | Lai et al. | |
| 7,107,348 B2 | 9/2006 | Shimada et al. | |
| 7,120,429 B2 | 10/2006 | Minear et al. | |
| 7,123,608 B1 | 10/2006 | Scott et al. | |
| 7,127,613 B2 | 10/2006 | Pabla et al. | |
| 7,130,921 B2 | 10/2006 | Goodman et al. | |
| 7,133,368 B2 | 11/2006 | Zhang et al. | |
| 7,134,961 B2 | 11/2006 | Hora | |
| 7,155,515 B1 | 12/2006 | Brown et al. | |
| 7,155,518 B2 | 12/2006 | Forslow | |
| 7,168,089 B2 | 1/2007 | Nguyen et al. | |
| 7,174,382 B2 | 2/2007 | Ramanathan et al. | |
| 7,177,950 B2 | 2/2007 | Narayan et al. | |
| 7,177,951 B1 | 2/2007 | Dykeman et al. | |
| 7,194,654 B2 | 3/2007 | Wray et al. | |
| 7,197,565 B2 | 3/2007 | Abdelaziz et al. | |
| 7,203,841 B2 | 4/2007 | Jackson et al. | |
| 7,216,359 B2 | 5/2007 | Katz et al. | |
| 7,240,093 B1 | 7/2007 | Danieli et al. | |
| 7,243,141 B2 | 7/2007 | Harris | |
| 7,254,709 B1 | 8/2007 | Richard | |
| 7,263,070 B1 | 8/2007 | Delker et al. | |
| 7,272,636 B2 | 9/2007 | Pabla | |
| 7,321,928 B2 | 1/2008 | Feltin et al. | |
| 7,340,500 B2 | 3/2008 | Traversat et al. | |
| 7,346,015 B2 | 3/2008 | Shipman | |
| 7,392,375 B2 | 6/2008 | Bartram et al. | |
| 7,398,388 B2 | 7/2008 | Xu et al. | |
| 7,407,434 B2 | 8/2008 | Thomas et al. | |
| 7,429,215 B2 | 9/2008 | Rozkin et al. | |
| 7,451,490 B2 | 11/2008 | Pirich et al. | |
| 7,457,279 B1 | 11/2008 | Scott et al. | |
| 7,533,172 B2 | 5/2009 | Traversat et al. | |
| 7,738,468 B2 * | 6/2010 | Standridge et al. | 370/401 |
| 7,803,052 B2 | 9/2010 | Multerer et al. | |
| 2001/0005368 A1 | 6/2001 | Rune | |
| 2001/0017856 A1 | 8/2001 | Asokan et al. | |
| 2001/0021188 A1 | 9/2001 | Fujimori et al. | |
| 2001/0044339 A1 | 11/2001 | Cordero et al. | |
| 2001/0046213 A1 | 11/2001 | Sakoda | |
| 2002/0002074 A1 | 1/2002 | White et al. | |
| 2002/0006114 A1 | 1/2002 | Bjelland et al. | |
| 2002/0013838 A1 | 1/2002 | Kushida et al. | |
| 2002/0016826 A1 | 2/2002 | Johansson et al. | |
| 2002/0035604 A1 | 3/2002 | Cohen et al. | |
| 2002/0055989 A1 | 5/2002 | Stringer-Calvert et al. | |
| 2002/0075844 A1 | 6/2002 | Hagen | |
| 2002/0085097 A1 | 7/2002 | Colmenarez et al. | |
| 2002/0097732 A1 | 7/2002 | Worster et al. | |
| 2002/0107786 A1 | 8/2002 | Lehmann-Haupt et al. | |
| 2002/0107935 A1 | 8/2002 | Lowery et al. | |
| 2002/0119821 A1 | 8/2002 | Sen et al. | |
| 2002/0138471 A1 | 9/2002 | Dutta et al. | |
| 2002/0143855 A1 | 10/2002 | Traversat et al. | |
| 2002/0147810 A1 | 10/2002 | Traversat et al. | |
| 2002/0161821 A1 | 10/2002 | Narayan et al. | |
| 2002/0183004 A1 | 12/2002 | Fulton et al. | |
| 2002/0184310 A1 | 12/2002 | Traversat et al. | |
| 2002/0184311 A1 | 12/2002 | Traversat et al. | |
| 2003/0027634 A1 | 2/2003 | Matthews, III | |
| 2003/0028585 A1 | 2/2003 | Yeager et al. | |
| 2003/0045359 A1 | 3/2003 | Leen et al. | |
| 2003/0046292 A1 | 3/2003 | Subramanian et al. | |
| 2003/0051052 A1 | 3/2003 | Shteyn et al. | |
| 2003/0055892 A1 | 3/2003 | Huitema et al. | |
| 2003/0055978 A1 | 3/2003 | Collins | |
| 2003/0079003 A1 | 4/2003 | Burr | |
| 2003/0084282 A1 | 5/2003 | Taruguchi | |
| 2003/0097408 A1 | 5/2003 | Kageyama et al. | |
| 2003/0104829 A1 | 6/2003 | Alzoubi et al. | |
| 2003/0115258 A1 | 6/2003 | Baumeister et al. | |
| 2003/0126229 A1 | 7/2003 | Kantor et al. | |
| 2003/0126245 A1 | 7/2003 | Feltin et al. | |
| 2003/0135625 A1 | 7/2003 | Fontes et al. | |
| 2003/0152034 A1 | 8/2003 | Zhang et al. | |
| 2003/0158961 A1 | 8/2003 | Nomura et al. | |
| 2003/0162556 A1 | 8/2003 | Libes | |
| 2003/0177187 A1 | 9/2003 | Levine et al. | |
| 2003/0182421 A1 | 9/2003 | Faybishenko et al. | |
| 2003/0182428 A1 | 9/2003 | Li et al. | |
| 2003/0191828 A1 | 10/2003 | Ramanathan et al. | |
| 2003/0217096 A1 | 11/2003 | McKelvie et al. | |
| 2003/0217135 A1 | 11/2003 | Chatani et al. | |
| 2003/0227939 A1 | 12/2003 | Yukie et al. | |
| 2003/0229779 A1 | 12/2003 | Morais et al. | |
| 2003/0229789 A1 | 12/2003 | Morais et al. | |
| 2003/0233281 A1 | 12/2003 | Takeuchi et al. | |
| 2004/0007618 A1 | 1/2004 | Oram et al. | |
| 2004/0015548 A1 | 1/2004 | Lee | |
| 2004/0018839 A1 | 1/2004 | Andric et al. | |
| 2004/0024879 A1 * | 2/2004 | Dingman et al. | 709/227 |

| | | | |
|---|---|---|---|
| 2004/0063497 | A1 | 4/2004 | Gould |
| 2004/0085947 | A1 | 5/2004 | Ekberg et al. |
| 2004/0087369 | A1 | 5/2004 | Tanaka |
| 2004/0088369 | A1 | 5/2004 | Yeager et al. |
| 2004/0103179 | A1 | 5/2004 | Damm et al. |
| 2004/0110563 | A1 | 6/2004 | Tanaka |
| 2004/0133631 | A1 | 7/2004 | Hagen et al. |
| 2004/0139228 | A1* | 7/2004 | Takeda et al. ................ 709/245 |
| 2004/0162871 | A1 | 8/2004 | Pabla et al. |
| 2004/0181463 | A1 | 9/2004 | Goldthwaite et al. |
| 2004/0207880 | A1 | 10/2004 | Thakur |
| 2004/0212589 | A1 | 10/2004 | Hall et al. |
| 2004/0236863 | A1 | 11/2004 | Shen et al. |
| 2004/0236945 | A1 | 11/2004 | Risan et al. |
| 2004/0243665 | A1 | 12/2004 | Markki et al. |
| 2004/0249891 | A1 | 12/2004 | Khartabil et al. |
| 2004/0254977 | A1 | 12/2004 | Zhang |
| 2004/0267876 | A1 | 12/2004 | Kakivaya et al. |
| 2005/0007964 | A1 | 1/2005 | Falco et al. |
| 2005/0015626 | A1 | 1/2005 | Chasin |
| 2005/0020354 | A1 | 1/2005 | Nguyen et al. |
| 2005/0026698 | A1 | 2/2005 | Pirich et al. |
| 2005/0063409 | A1 | 3/2005 | Oommen |
| 2005/0064939 | A1 | 3/2005 | McSheffrey et al. |
| 2005/0065632 | A1 | 3/2005 | Douglis et al. |
| 2005/0080858 | A1 | 4/2005 | Pessach |
| 2005/0086287 | A1 | 4/2005 | Datta |
| 2005/0086288 | A1 | 4/2005 | Datta et al. |
| 2005/0086329 | A1 | 4/2005 | Datta et al. |
| 2005/0086350 | A1 | 4/2005 | Mai |
| 2005/0086369 | A1 | 4/2005 | Mai et al. |
| 2005/0105526 | A1* | 5/2005 | Stiemerling et al. .......... 370/389 |
| 2005/0141522 | A1 | 6/2005 | Kadar et al. |
| 2005/0149481 | A1 | 7/2005 | Hesselink et al. |
| 2005/0221858 | A1 | 10/2005 | Hoddie |
| 2005/0250487 | A1 | 11/2005 | Miwa |
| 2005/0251577 | A1 | 11/2005 | Guo et al. |
| 2005/0259637 | A1* | 11/2005 | Chu et al. ..................... 370/352 |
| 2006/0063587 | A1 | 3/2006 | Manzo |
| 2006/0067920 | A1 | 3/2006 | Jensen |
| 2006/0068702 | A1 | 3/2006 | Miwa |
| 2006/0075127 | A1* | 4/2006 | Juncker et al. ................ 709/229 |
| 2006/0084504 | A1 | 4/2006 | Chan et al. |
| 2006/0111979 | A1 | 5/2006 | Chu |
| 2006/0209822 | A1 | 9/2006 | Hamamoto |
| 2006/0218624 | A1 | 9/2006 | Ravikumar et al. |
| 2006/0288103 | A1 | 12/2006 | Gobara et al. |
| 2007/0058792 | A1 | 3/2007 | Chaudhari et al. |
| 2007/0061460 | A1 | 3/2007 | Khan et al. |
| 2007/0077981 | A1 | 4/2007 | Hungate et al. |
| 2007/0150552 | A1 | 6/2007 | Harris et al. |
| 2007/0165629 | A1 | 7/2007 | Chaturvedi et al. |
| 2007/0191109 | A1 | 8/2007 | Crowder et al. |
| 2007/0198418 | A1 | 8/2007 | MacDonald et al. |
| 2007/0208748 | A1 | 9/2007 | Li |
| 2007/0213124 | A1 | 9/2007 | Walker et al. |
| 2007/0217436 | A1 | 9/2007 | Markley et al. |
| 2007/0237153 | A1 | 10/2007 | Slaughter et al. |
| 2009/0077245 | A1 | 3/2009 | Smelyansky et al. |
| 2009/0111532 | A1 | 4/2009 | Salokannel et al. |
| 2009/0138610 | A1 | 5/2009 | Gobara et al. |
| 2009/0228593 | A1 | 9/2009 | Takeda |
| 2009/0240821 | A1 | 9/2009 | Juncker et al. |

FOREIGN PATENT DOCUMENTS

| | | |
|---|---|---|
| EP | 1 107 508 | 6/2001 |
| EP | 1 374 959 | 5/2003 |
| JP | 2001 53901 | 2/2001 |
| JP | 2002 10321 | 1/2002 |
| JP | 2004 135778 | 5/2004 |
| WO | WO 99/35799 | 7/1999 |
| WO | WO 01/97485 | 12/2001 |
| WO | WO 02/03217 | 1/2002 |
| WO | 02/11366 | 2/2002 |
| WO | WO 02/23822 | 3/2002 |
| WO | 03/069495 | 8/2003 |
| WO | 2004/038541 A2 | 5/2004 |
| WO | WO2004/063843 | 7/2004 |
| WO | WO2005/088466 | 9/2005 |

OTHER PUBLICATIONS

Guha et al., NUTSS: A SIP-based Approach to UDP and TCP Network Connectivity, Aug. 30, 2004, Retrieved from http://www.mpi-sws.org/~francis/fdna02-guha1.pdf, pp. 1-6.*
J. Rosenberg, "Simple Traversal of UDP Through Network Address Translators (NAT)", BEHAVE Internet-Draft, Jul. 17, 2005.
J. Rosenberg, "Interactive Connectivity Establishment (ICE): A Methodology for Network Address Translator (NAT) Traversal for Offer/Answer Protocols", MMUSIC Internet-Draft, Jul. 17, 2005.
F. Audet, "NAT Behavioral Requirements for Unicast UDP", BEHAVE Internet Draft, Jul. 15, 2005.
J. Rosenberg, "Interactive Connectivity Establishment (ICE): A Methodology for Network Address Translator (NAT) Traversal for Multimedia Session Establishment Protocols", MMUSIC Internet-Draft, Oct. 25, 2004.
J. Rosenberg, Traversal Using Relay NAT (TURN), MIDCOM Internet-Draft, Oct. 20, 2003.
Y. Takuda, "Symmetric NAT Traversal using STUN", Internet Engineering Task Force, Jun. 2003.
J. Rosenberg, "STUN—Simple Traversal of User Datagram Protocols (UDP) Through Network Address Translators (NATs)", Network Working Group, Mar. 2003.
J. Rosenberg, "Interactive Connectivity Establishment (ICE): A Methodology for Network Address Translator (NAT) Traversal for Offer/Answer Protocols", MMUSIC Internet-Draft, Jan. 16, 2007.
International application No. PCT/US2006/038285, "The International Search Report and the Written Opinion of the International Searching Authority".
Arno Wacker et al—"A NAT Traversal Mechanism for Peer-to Peer Networks"—Eighth International Conference on Peer-to Peer Computing (P2P'08), 2008. IEEE. pp. 81-83.
Jim Dowling et al.—"Improving ICE Service Selection in a P2P System using the Gradient Topology"—First International Conference on Self-Adaptive and Self-Organizing Systems (SASO 07) , 2007, IEEE, pp. 285-288.
European Search Report dated Jan. 28, 2010 issued for European patent application No. 99252219.2.
Office Action dated Mar. 24, 2010 issued for U.S. Appl. No. 12/235,409.
Office Action dated Jun. 4, 2009 issued for U.S. Appl. No. 10/215,899.
Office Action dated Nov. 7, 2008 issued for U.S. Appl. No. 10/215,899.
Office Action dated Mar. 13, 2008 issued for U.S. Appl. No. 10/215,899.
Office Action dated Sep. 11, 2007 issued for U.S. Appl. No. 10/215,899.
Office Action dated Mar. 22, 2007 issued for U.S. Appl. No. 10/215,899.
Office Action dated Aug. 12, 2005 issued for U.S. Appl. No. 10/215,899.
NAT and Network Games, p. 1-5, entitled: Just the FAOs, Ma'am, http://www.u.arizona.edu/~trw/games/nat.htm, Oct. 23, 2002.
BroadbandReports.com, How to hookup our console to the net—section all, pp. 1 to 22, http://www.dslreports.com/faq/onlinegaming/all.
Do I use NAT?, pp. 1 to 3, http://www.u.arizona.edu/~trw/games/nat or not.php, Oct. 23, 2002.
Home Toys Article, HAI Omni Solution, UPnP NAT Traversal FAQ, pp. 1 to 4 http://hometoys.com/htinews/aug01/articles/microsoft/upnp.htm, Nov. 11, 2002.
InternetGatewayDevice: I Device Template Version 1.01, Copyright 1999-2001 Microsoft Corporation, 16 pgs.
STUN—Simple Traversal of UDP Thrugh NATs, J. Rosenberg et al. pp. 1-29, Copyright the Internet Society.
Traversal Using Relay NAT (TURN), Rosenberg, Weinberger, Huitema, Mahy, Nov. 14, 2001, pp. 1 to 17.
http://www2.simplex.com/ip.shtml.
http://www.dslreports.com/ip.
Network Address Translators. Microsoft Corporation Jan. 2001, http://msdn.microsoft.com/library/default.asp?irl=/library/en-us/dnplay/html/nats2-msdn.asp.

Nat and Peer-to-Peer networking, Dan Kegel. Copyright 1999 http://alumnus.caltech.edu/-dank/peer-nat.html.

Office Action dated May 5, 2009 issued for U.S. Appl. No. 11/708,988.

Final Office Action dated Oct. 29, 2009 issued for U.S. Appl. No. 11/708,988.

Office Action dated Feb. 22, 2010 issued for U.S. Appl. No. 11/708,988.

Notice of Allowance and Fee(s) Due dated Oct. 28, 2009 for U.S. Appl. No. 10/215,899.

Office Action issued by the European Patent Office (EPO) on Feb. 17, 2010 for European patent application No. 09022219.2.

Office Action issued by the USPTO on Apr. 15, 2010 for U.S. Appl. No. 12/235,438.

PCT International Search Report dated Sep. 28, 2009 for international application No. PCT/US2009/034913.

Final Office Action dated Jul. 19, 2010 issued for U.S. Appl. No. 12/235,409.

Final Office Action dated Aug. 31, 2010 issued for U.S. Appl. No. 12/235,438.

Notice of Allowance and Fees Due dated Jul. 22, 2010 issued for U.S. Appl. No. 12/043,080.

The International Search Report of the Written Opinion of the International Searching Authority dated Nov. 6, 2009 for the international application No. PCT/US2009/057192.

Steven Hessing; "Peer to Peer Messaging Protocol (PPMP)" Internet Draft, Apr. 2002, pp. 1-57, XP015001173.

Song Siang et al: "FloodTrial : an efficient file search technique in unstructured peeito-peer systems" GLOBECOM 2003, vol. 5, Dec. 1, 2003, pp. 2891-2895, XP010678188.

Dutkiewicz E Ed—Institute of Electrical and Electronics Engineers: "Impact of transmit range on throughput performance in mobile ad hoc networks" ICC 2001. 2001 IEEE International Conference on Communications, Conference Record. Helsinky, Finland, Jun. 11-14, 2001, IEEE International Conference on Communications, New York, NY IEEE, US, vol. VOL. 1 of 10, Jun. 11, 2001, pp. 2933-2937, XP 010553662 ISBN: 0-7803-7097-1.

Kim Y Ed—Association for Computing Machinery: "Simple and Fault-Tolerant Key Agreement by Dynamic Collaborative Groups", Proceedings of the 7m ACM Conference on Computer and Communications Security. CS 2000. Athens, Greece, Nov. 1-4, 2000, ACM Conference on Computer and Communications Security, New Your, NY: ACM, US, vol. Conf. 3, Nov. 1, 2000, pp. 1 38, XP 002951317 ISBN: 1-58113-2034.

Baughman et al., Cheat-proof playout for centralized and distributed online games, INFOCOM2001, Twentieth Annual Joint Conference of the IEEE Computer and Communications Societies. Proceedings. IEEE Publication Date.: 2226 Apr. 2001, on pp. 104-113, vol. 1.

\* cited by examiner

PEER-TO-PEER COMMUNICATION TRAVERSING SYMMETRIC NETWORK ADDRESS TRANSLATORS

FIELD OF THE INVENTION

Embodiments of this invention are related to computer networks and more specifically to peer-to-peer communications across symmetric network address translators on computer networks.

BACKGROUND OF THE INVENTION

Use of a router that has a NAT (Network Address Translation) feature has been intervening in accessing from the external network to the internal network which is evidently a problem for peer-to-peer applications such as voice communication over the Internet (known as VoIP) and/or online gaming, etc. NAT is an Internet standard that enables a local area network (LAN) to use of one set of private IP addresses for internal traffic and a second set of global IP addresses for external traffic. A node that has NAT capability is often referred as "NAT box".

A NAT (literally) translates network (IP) address between the two networks. Network Address Port Translation (NAPT) translates not only IP address but also port numbers of a transport layer protocol. Although NAT/NAPT has its good properties, there is a significant side effect. If the translation is dynamically performed, nodes in the external network have no way to know the IP address (and the port number) on the NAT ahead of time to reach a node in the internal network. Unfortunately, this is the most common behavior of NAT in the residential and SOHO routers deployed in the current market.

NAPT (hereinafter, called "NAT" unless stated otherwise) is the most common NAT in today's residential routers. In a NAT, an IP address is used to identify an end node, or a host. There may be more than one application running on the same node. Typically, each application has a unique port number allocated to the same IP address. That is, in order to identify an application, both an IP address and a port number must be specified. The set of IP address and a port number is often called "transport address" which is typically denoted as <ip-address>:<port>.

The notion of "port" is important to understand NAT behavior. A NAT allows two or more IP nodes behind the NAT to share a single global IP address, by translating the port numbers. When an application on a node sends a packet to a server on the public network, the NAT allocates a public transport address, having an external IP address and an external port number that is associated with the source transport address. This association created by NAT is known as "NAT Binding". When another application on a different node behind the NAT sends a packet to the same server the NAT creates another binding with the same external IP address but with another port number. For the server, those packets look like they originated from the same node but from different port numbers. The server then simply sends responses back to those external transport addresses on the NAT. Since the NAT already has bindings for packets received from the server these packets can be correctly forwarded to the associated local nodes. A problem occurs when a node behind the NAT wants to be accessed from anyone from the public network. A NAT binding cannot be created by packets from the pubic network. The NAT can forward the inbound packets only if an associated binding already exists.

To address this problem, many routers have a Port Forwarding feature which allows a user to manually configure the routing table in the router. As opposed to NAT binding, a specified external transport address on the NAT is static so that any inbound packets arrived on the external transport address are forwarded to the specified local node on the private network. Unfortunately, such manual configuration requires users to have sufficient knowledge of TCP/IP protocol and NAT. Users also need to know the transport addresses of the applications running on the local nodes to configure the port forwarding tables. Since port forwarding is not a standardized feature, each router has a different configuration menu some of which might not be able to meet requirements from an application. To application vendors, the cost for customer support for those users who are experiencing trouble with configuration for various NATs would be very significant.

Network Address Translators (NATs), while providing many benefits, also come with many drawbacks. The most troublesome of those drawbacks is the fact that they break many existing IP applications, and make it difficult to deploy new ones. Although guidelines have been developed that describe how to build "NAT friendly" protocols, many protocols simply cannot be constructed according to those guidelines. Examples of such protocols include almost all peer-to-peer protocols, such as multimedia communications, file sharing and games.

NAT is not a concern if a session is initiated from the internal network to the external network. In client-server system such as Web (HTTP) services or E-mail (SMTP/POP3) system, a client typically initiates a connection to a server, and NAT works well with this client-server model and the deployment of NAT has been very successful.

As the Internet population and its available bandwidth grow the demand for sending and receiving large amount data directly between peers over the Internet has gotten more. As opposed to the client-server model, connecting peer-to-peer solves issues with bandwidth scalability, data propagation delay and a cost for central servers. Well-known applications of this peer-to-peer model today are VoIP and file sharing systems, etc. The peer-to-peer solution is very attractive. It has, however, significant issues with connectivity between the peers through NAT.

It has been observed that NAT treatment of User Datagram Protocol (UDP) varies among implementations. Four treatments commonly observed in implementations are, Full Cone, Restricted Cone, Port Restricted Cone and Symmetric. A full cone NAT is one where all requests from the same internal IP address and port are mapped to the same external IP address and port. Furthermore, any external host can send a packet to the internal host, by sending a packet to the mapped external address. In a restricted cone NAT all requests from the same internal IP address and port are mapped to the same external IP address and port. Unlike a full cone NAT, an external host (with IP address X) can send a packet to the internal host only if the internal host had previously sent a packet to IP address X. A port restricted cone NAT is like a restricted cone NAT, but the restriction includes port numbers. Specifically, an external host can send a packet, with source IP address X and source port P, to the internal host only if the internal host had previously sent a packet to IP address X and port P.

In a symmetric NAT all requests from the same internal IP address and port, to a specific destination IP address and port, are mapped to the same external IP address and port. If the same host sends a packet with the same source address and port, but to a different destination, a different mapping is used. Furthermore, only the external host that receives a packet can send a UDP packet back to the internal host.

One prior art NAT traversal solution has been developed based on UPnP (Universal Plug and Play), a technical specification that enables communications among home appliances such as PC, AudioNideo devices, phones and etc., proposed by Microsoft in 1999 and supported by more than 20 companies including Intel, 3Com, AT&T, Dell Computer, etc. UPnP provides NAT traversal solution that allows a node behind a UPnP compliant NAT to discover the presence of the NAT and to add and delete external port mapping on the NAT. It is an automatic port forwarding configuration, so to speak. Many residential routers support UPnP today, however, not all of them do. Some UPnP compliant routers have UPnP mode turned off by default. Users may be prompted to turn on the UPnP mode manually, but this essentially falls into the same issue with the port forwarding.

UDP hole punching is another popular and effective NAT traversal technique that works well with most of the residential routers' NAT types. As illustrated in FIG. 1, this technique literally, it creates "a UDP hole" (or NAT binding) by sending a UDP packet 1 from a local node 2 behind a NAT 3 to the public network 4. In this example, the local node 2 has an IP address 192.168.0.2 and the UDP packet 1 is sent from local port 5060. The NAT 4 creates a binding which maps the local transport address of the local node 2 to a public transport address having a different IP address and port number. Once the NAT binding (UDP hole) is created, an allocated external port 5 can be used to receive packets 6 from anyone on the public network 4, e.g., a remote node 7, and get them forwarded to the local node 1 that created the binding initially.

Unfortunately, it is known that some NATs, e.g., Port restricted-cone or Symmetric NATs, forward the inbound packets received on the external port 5 only if the packets are sent from the same transport address (combination of IP address and port number) to which the initial hole punching packet was sent. Moreover, following issues needs to be solved to make use of UDP hole punching: (1) how can the external port number be obtained? (2) How the NAT behavior can be ascertained? (3) Will the same external port number allocated when the local node send a packet to the remote node?

To address these issues a protocol known as Simple Traversal of UDP through NAT (STUN) has been developed. STUN is a lightweight protocol proposed by Internet Engineering Task Force (IETF) that allows an IP enabled node to discover the presence and types of NAT that the node is behind. STUN works with most of NATs and does not depend on any special behavior of the NAT. The STUN server acts like a mirror held up to a node so that the node can see how its local transport address gets mapped to a public transport address.

In the example depicted in FIG. 2 STUN is of a client-server model, treating a NAT 10 as a black-box located between a client and server. A STUN client 11 at local transport address e.g., 192.168.0.2:5060 sends a binding request packet 12 to a STUN server 13 located on the public network 14 at transport address 67.2.2.2:3748. The NAT 10 allocates a public transport address of e.g., 67.1.2.3:6000 to the request packet 12. Then the STUN server 13 generates a response packet 15 that contains the source transport address (67.1.2.3:6000 in this example) of the request packet 12 in its payload so that the client 11 can tell if a NAT is present in the path by comparing the source transport address with its local transport address. The STUN client 11 also finds out the type of the NAT 10 through the communication with the STUN server 13. Additional details of the STUN protocol can be obtained from RFC 3489, by J. Rosenberg et al., "STUN—Simple Traversal of User Datagram Protocol (UDP) Through Network Address Translators (NATs)", which is incorporated herein by reference. The STUN protocol defines the four types of NAT behavior (Full Cone, Restricted Cone, Port Restricted Cone and Symmetric) as described above.

It is important to note that the STUN protocol alone does not support a complete NAT traversal mechanism. It just helps to get necessary information about a target NAT observed by STUN server and client. A typical NAT traversal scenario with STUN and UDP hole punching is performed as follows:

1. A local node A sends a binding request packet to STUN server.
2. Node A receives response packet with MAPPED-ADDRESS from the STUN server.
3. Node A sends a connection request to Node B with the MAPPED-ADDRESS via a proxy server. (e.g., a SIP proxy server).
4. Node B sends a response back to Node A with Node B's transport address to Node A via the proxy server.
5. Node A sends a UDP hole punching packet to Node B.
6. Node B starts sending packets directly to the MAPPED-ADDRESS.
7. The packets from Node B successfully get forward to Node A by the NAT.

As described above, Node A and Node B need to exchange signals with their routable transport addresses through an intermediary (proxy) server prior to peer-to-peer connection establishment. SIP (Session Initiation Protocol) is a standardized signaling protocol, widely used for Voice over IP applications. Details of SIP are set forth in RFC 3261, which is incorporated herein by reference.

In the general NAT traversal mechanism described above, it is assumed that the MAPPED-ADDRESS obtained by using STUN can be used by Node B to reach Node A. This, however, is NOT true if the NAT is Symmetric. Since a Symmetric NAT allocates a different external port number if the destination address is different, the MAPPED-ADDRESS is not useful for Node B. Traversing a Symmetric NAT has generally been regarded as extremely difficult if not impossible.

The current practice to overcome the Symmetric NAT case is to utilize a relay server such as Traversal Using Relay NAT (TURN). TURN is a server-client protocol that allows a natted node to allocate an external transport address on a TURN server located in the public network. TURN server behaves just like a network address port translation (NAPT) box shared by many natted nodes, and relays traffic received on the allocated external port to a TURN client behind a NAT box. TURN can support any type of NAT behavior because traffic made to a TURN server is of a client-server model. However, it is clear that TURN has a significant scalability issue because all the traffic has to go through the central server.

Therefore, although several NAT traversal techniques have been developed, however, none of them have adequately solved the issue of traversal of a Symmetric NAT without a help from a relay server. Issues of NAT traversal are described in considerable detail in US Patent Application Publication 2004/0139228 entitled "Peer-to-peer (P2P) connection despite network address translators (NATs) at both ends", which is incorporated herein by reference. Prior art solutions for traversal of the Symmetric NAT case involve highly complex operations.

One attempt Symmetric NAT traversal is based on port prediction. As shown in FIG. 3, node A is behind a Symmetric NAT. Recall that a Symmetric NAT allocates a different port each time it sends a packet. An initial packet from node A may be sent to node C through port 6001. Node B can respond to node A through port 6001. However, node A's communication with node B may be through port 6002. Subsequent packets sent from node B to port 6001 will be discarded since the NAT binding on port 6001 does not recognize node B. Port prediction takes advantage of the behavior of a Symmetric NAT in assigning ports. Typically, the Symmetric NAT increments the port number in subsequent bindings by an amount delta-P. In the above example, delta-P is equal to 1. Thus if node A can discover whether it is behind a Symmetric NAT, e.g., using STUN, and determine the value of delta-P it can send this information to node B. When node B next attempts to contact with node A, it sends a packet to a new transport address with the previous IP address and a port number equal to the previous port number incremented by delta-P.

Unfortunately, port prediction appears to be a "brittle" technique (as it is prediction based) and subject to failure in certain circumstances. Port prediction as described above also requires node A to send node B information regarding the type of the NAT and the value of delta-P. Port prediction techniques are known to those skilled in the art, e.g., as described in greater detail by Yutaka Takeda in "Symmetric NAT Traversal using STUN, <draft-takeda-symmetric-nat-traversal-00.txt>" a copy of which can be accessed on the Internet at http://www.ietf.org/proceedings/03nov/I-D/draft-takeda-symmetric-nat-traversal-00.txt, and which is incorporated herein by reference.

Another attempted solution to the problem of Symmetric NAT traversal is known as ICE (Interactive Connectivity Establishment). ICE is a very efficient and promising technology but it is also a relatively new methodology. ICE causes a node known as an initiation to send a transport address to another node referred to as a responder and asks the responder to send communication to an IPv6 address. ICE makes the fundamental assumption that clients (node s) exist in a network of segmented connectivity. This segmentation is the result of a number of addressing realms in which a client can simultaneously be connected. The term "realms" is used here in the broadest sense. A realm is defined purely by connectivity. Two clients are in the same realm if, when they exchange the addresses each has in that realm, they are able to send packets to each other. This includes IPv6 and IPv4 realms, which actually use different address spaces, in addition to private networks connected to the public Internet through NAT. The key assumption in ICE is that a client cannot know, a priori, which address realms it shares with any peer it may wish to communicate with. Therefore, in order to communicate, the client has to try connecting to addresses in all of the realms.

The basic flow of operation for ICE is shown in FIG. 4. Before an initiator I establishes a session, it obtains at step 21 as many IP address and port combinations in as many address realms as it can from one or more NAT discover servers N (e.g., STUN or TURN servers). These addresses all represent potential points at which the initiator I can receive a specific media stream. Any protocol that provides a client with an IP address and port on which it can receive traffic can be used. These include STUN, TURN, RSIP, and even a VPN. The client may also use any local interface addresses. For example, a dual-stack v4/v6 client will obtain both a v6 and a v4 address/port. Unfortunately, if the initiator communicates with a peer that doesn't support ICE, only one address can be provided to that peer. As such, the initiator I will need to choose one default address, which will be used by non-ICE clients. This may be a TURN derived transport address, as it is most likely to work with unknown non-ICE peers.

In the example depicted in FIG. 4, the initiator I then runs a STUN server on each the local transport addresses it has obtained. These include ones that will be advertised directly through ICE, and so-called associated local transport addresses, which are not directly advertised; rather, the transport address derived from them is advertised. The initiator I will need to be able to demultiplex STUN messages and media messages received on that IP address and port, and process them appropriately. All of these addresses are placed into the initiate message, and they are ordered in terms of preference. Preference is a matter of local policy, but typically, the highest priority is given to IPv6 addresses, the next highest priorities are given to local addresses, and STUN-derived address and transport addresses learned from a TURN server (i.e., TURN derived transport addresses) and the lowest priority to relay server addresses.

At step 22, the initiator I sends an initiate message to the responder R. Standard signaling protocol specific mechanisms may be used to enable the signaling messages to traverse any intervening NATs between the initiator I and the responder R. At step 23, the responder R follows a similar process as the initiator followed; it obtains addresses from the NAT discovery servers N it places all of them into an accept message at step 24. Once the responder R receives the initiate message, it has a set of potential addresses it can use to communicate with the initiator I. The initiator I may be running a STUN server at each address. At step 25, the responder R performs connectivity checks, e.g., by sending a STUN request to each address, in parallel. When the initiator I receives these, it sends a STUN response as indicated at step 26. If the responder R receives the STUN response, it knows that it can reach its peer at that address. It can then begin to send media to that address at step 27. As additional STUN responses arrive, the responder R will learn about additional transport addresses which work. If one of those has a higher priority than the one currently in use, it starts sending media to that one instead. No additional control messages (i.e., SIP signaling) occur for this change.

The STUN messages described above happen while the accept message is being sent to the intitiator I. Once the intitiator I receives the accept message, it too will have a set of potential addresses with which it can communicate to the responder. The initiator I follows exactly the same STUN check process described above at step 27 and can begin sending media at step 28 to the responder R once it receives a STUN response. Furthermore, when a either the initiator I or responder R receives a STUN request, it takes note of the source IP address and port of that request and compares that transport address to the existing set of potential addresses. If the transport address is not amongst the set of potential addresses, it gets added as another potential address. The incoming STUN message provides the client with enough context to associate that transport address with priority, just as if it had been sent in an initiate or accept message. As such, the client (initiator or responder) begins sending STUN messages to it as well, and if those succeed, the address can be used if it has a higher priority.

Those of skill in the art will be familiar with the ICE protocol and various ways of implementing it. For example, ICE is described in detail by J. Rosenberg in "Interactive Connectivity Establishment (ICE): A Methodology for Network Address Translator (NAT) Traversal for Multimedia Session Establishment Protocols" a copy of which can be downloaded from the internet at http://tools.ietforg/wg/mmusic/draft-ietf-mmusic-ice/draft-ietf-mmusic-ice-03.txt, and which is incorporated herein by reference.

Although ICE is a recognized and implemented methodology, there is currently no way for ICE to send information about NAT type to facilitate the prior art port prediction (e.g., as set forth in US 2004/0139228). One would have to add another field for the methodology to handle this information and implement port prediction. This would add extra processes to both ends, and also exposing NAT types to other nodes could become a security concern. Moreover, adding a new field may break compatibility with existing systems that support standard ICE.

Thus, there is a need in the art, for an improved method for peer-to-peer communication traversing symmetric network address translators and a system for implementing such a method.

SUMMARY OF THE INVENTION

To overcome the above disadvantages, embodiments of the invention are directed to systems and methods for peer-to-peer communication over a network between a first node behind a first network address translator (NAT) and a second node behind a second NAT, despite the first NAT and the second NAT intervening between the first and second nodes. The first NAT is a Symmetric NAT. A port prediction is performed wherein the first node constructs a list of predicted transport addresses on the first NAT. A message containing the list of predicted transport addresses is sent from the first node to the second node. A connectivity check is performed with the second node using the predicted transport addresses.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
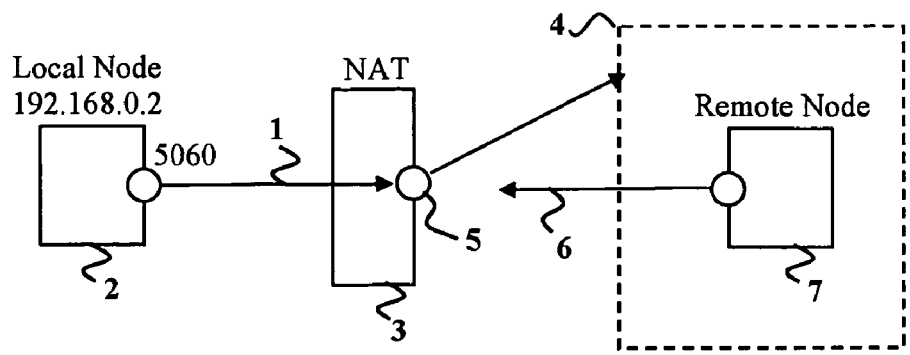
FIG. 1 is a schematic diagram illustrating UDP hole punching on a network according to the prior art.
Figure 2:
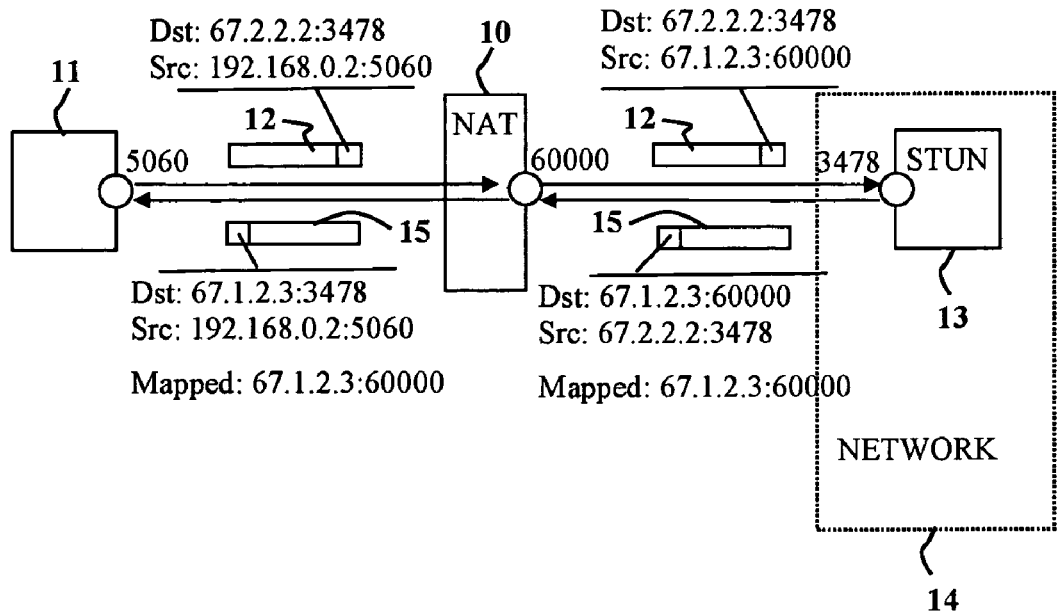
FIG. 2 is a schematic diagram illustrating the STUN protocol according to the prior art.
Figure 3:
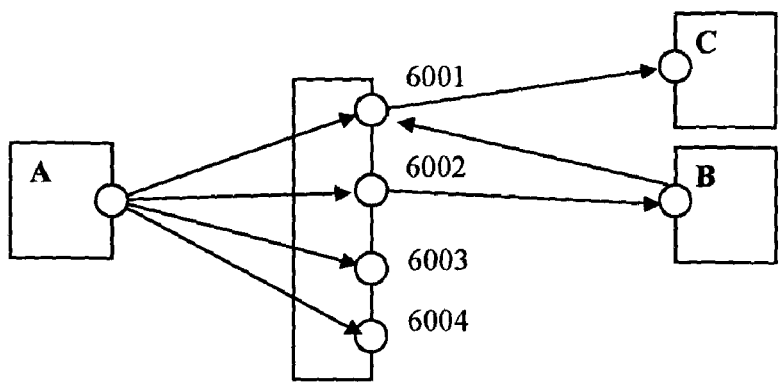
FIG. 3 is a schematic diagram illustrating port prediction according to the prior art.
Figure 4:
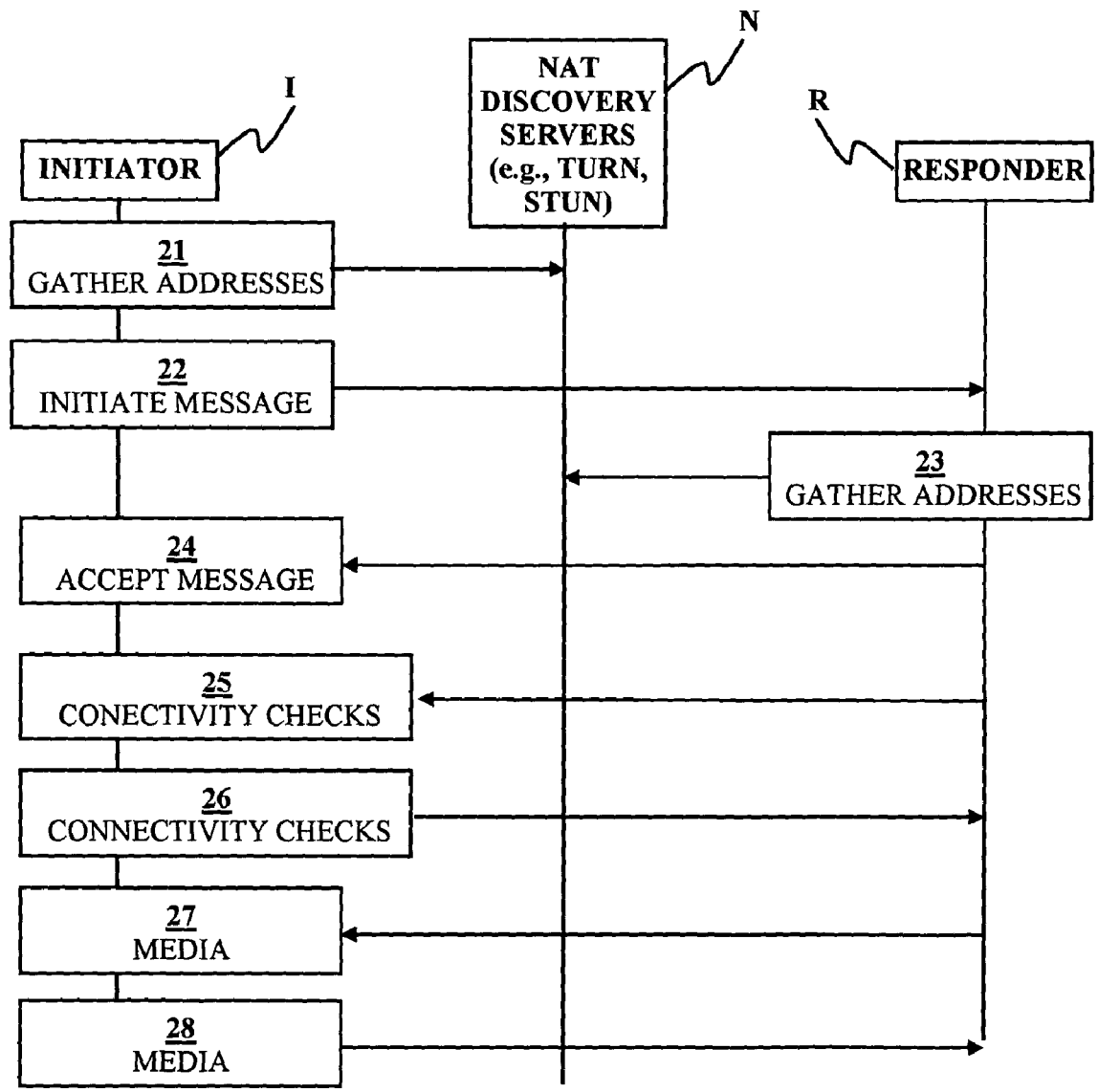
FIG. 4 is a flow diagram illustrating the basic flow of operation for an Interactive Connectivity Establishment (ICE) methodology according to the prior art.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Terminology

As used herein, the following terms have the meanings shown in Table I below.

TABLE I

| | |
|---|---|
| natted node | A node behind a NAT. |
| client-server | A network architecture model where all clients connect to a central server. (ex. Web (HTTP) service, etc.) |
| peer-to-peer | A network architecture that does not depend on a central server. Each client (peer) directly connects to other peers. (ex. DHT, VoIP, file sharing system, etc.) |
| transport address | A set of IP address and port number. |
| Voice over IP (VoIP) | A technology enabling routing of conversations over the Internet or any other IP network. |

Acronyms

As used herein, the following acronyms have the meanings shown in Table II below.

TABLE II

| | |
|---|---|
| DHT | Distributed Hash Table (ex. Chord) |
| HTTP | Hyper Text Transfer Protocol |
| IETF | Internet Engineering Task Force |
| LAN | Local Area Network |
| NAT | Network Address Translator (RFC 3022) |
| NAPT | Network Address Port Translation (RFC 3022) |
| SIP | Session Initiation Protocol (RFC 3261) |
| SSP | Session Setup Protocol |
| SOHO | Small Office and Home Office |
| STUN | Simply Traversal UDP through NAT |
| TURN | Traversal Using Relay NAT |
| VoIP | Voice over IP |

Embodiments of the invention address issues with Symmetric NAT traversal, while improving on security issues associated with the prior art and greatly simplifying the overall operation for traversing Symmetric NAT. In embodiments of the present invention, nodes behind NATs exchange transport address information instead of information about the NATs. Exchanging transport addresses instead of NAT information conforms well to ICE (Interactive Connectivity Exchange) methodology, and considerably improves overall NAT traversal operations. Embodiments of the present invention derive to combine in novelty the two methodologies, ICE and analytical port prediction methods, such as those described in the Internet Engineering Task Force (IETF) draft entitled "Symmetric NAT Traversal using STUN", which is incorporated herein by reference.

The embodiment illustrated below with FIG. 5 and FIG. 6 pertains to a peer-to-peer UDP session establishment using SIP (Session Initiation Protocol; RFC 3261) protocol. The invention, however, is applicable to any other signaling protocols that allow a peer to send and receive signals to another peer via a proxy server on the pubic network prior to a peer-to-peer direct connection establishment. Such signaling protocols may include but are not limited to H.323, MGCP, HTTP, XMPP, etc.

Figure 5:
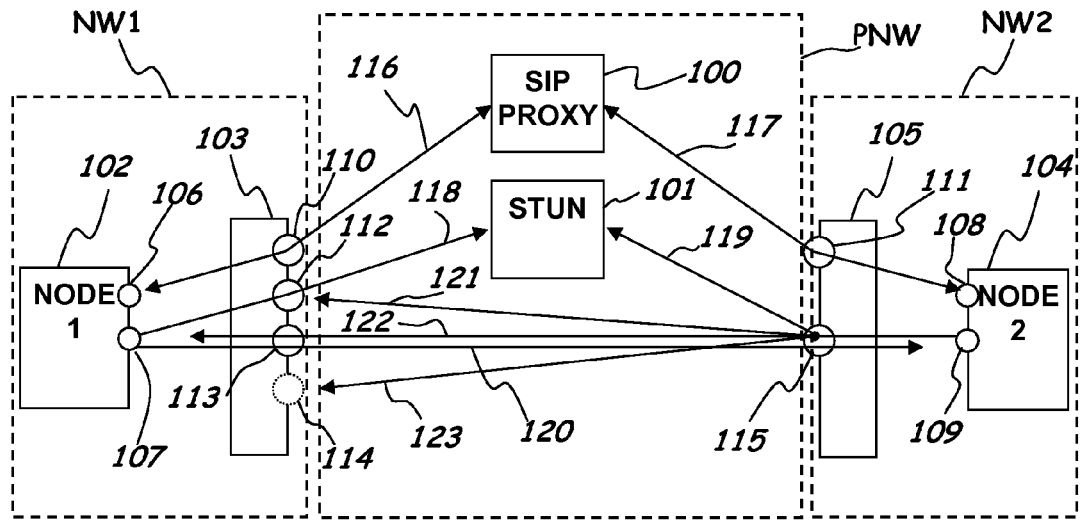
FIG. 5 is a schematic diagram illustrating a system NAT traversal between two nodes according to an embodiment of the present invention.

As shown in FIG. 5, a first node 102 resides in a first private network NW1 that is physically connected to a public network PNW (e.g., the internet) via a first NAT 103. Similarly, second node 104 resides in a second private network NW2 and is able to access the same public network via a second NAT 105. The private networks NW1 and NW2 may each include other nodes and other NATs in addition to the first and second nodes 102, 104 and the first and second NATs 103, 105. Other private networks may also be connected to the public network PNW. The pubic network PNW includes an SIP proxy server 100, and a STUN server 101. The first node 102 has a private IP address that is valid only in the first private network NW1 behind the first NAT 103. The first node 102 has a globally unique and routable IP address, and the first NAT 103 performs IP address and port translation between the public network and the private network. Similarly, the second node 104 has a private IP address that is valid only in the second private network NW2 behind the second NAT 105. The second node 104 has a globally unique and routable IP address, and the second NAT 105 performs IP address and port translation between pubic network and the private network.

The nodes 102, 104 can be, e.g., server hosts such as audio/video (A/V) chat, multimedia streaming devices, file sharing nodes, online gaming modules etc. Each node 102, 104 may be a general purpose computer that becomes a special purpose computer when running instructions, such as instructions for implementing the steps of the method of FIG. 6. By way of example, the nodes 102 and 104 may be SIP user agents and able to send and receive messages each other through a SIP proxy server 100. The nodes 102 and 104 are also STUN clients. Thus, the first node 102 is able to discover the presence and types of NAT in the path between the first node 102 and the STUN server 101 by a communication with the STUN server 101 using STUN protocol. The second node 104 is similarly able to discover the presence and types of NAT between the second node 104 and the STUN server 101.

Figure 6:
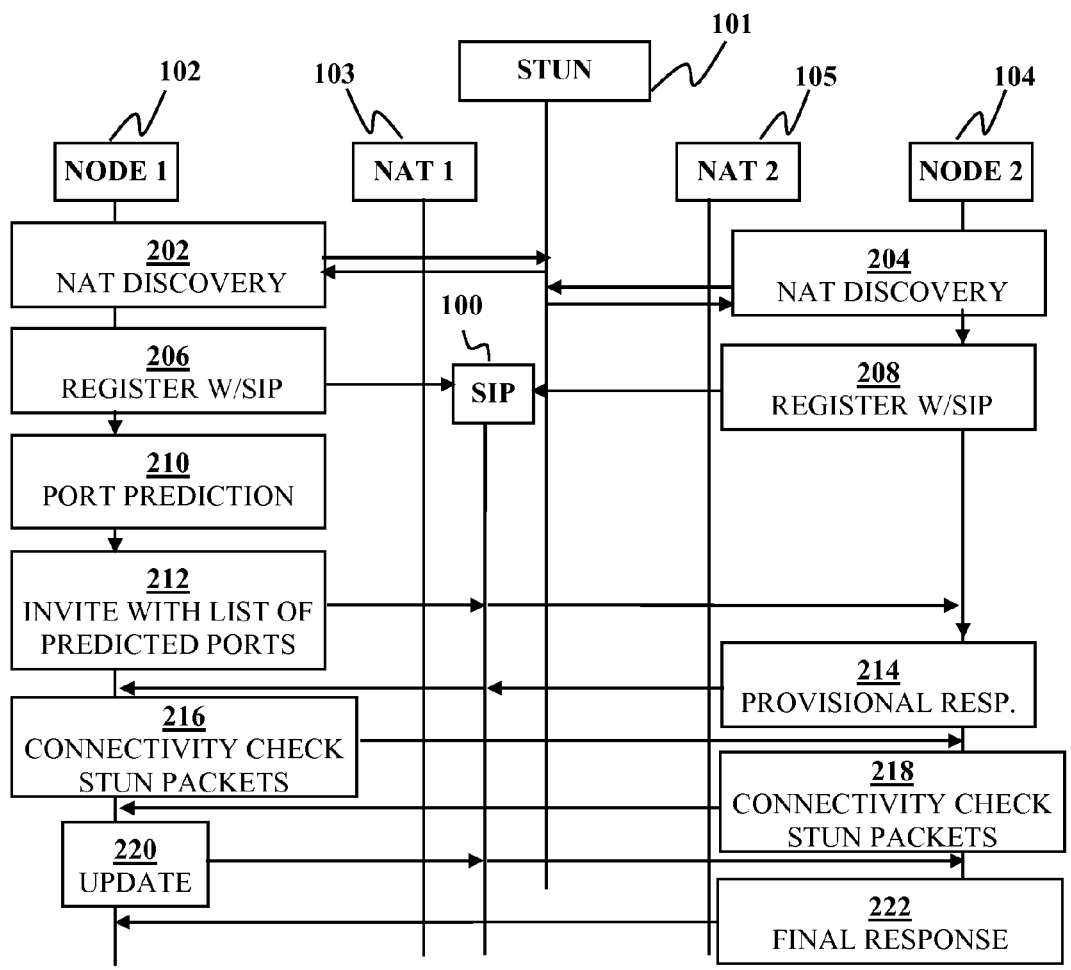
FIG. 6 is a flow diagram illustrating a method of NAT traversal between two nodes according to an embodiment of the present invention.

A method of NAT traversal according to embodiments of the present invention may be understood by simultaneously referring to the block diagram of FIG. 5 and flow diagram of FIG. 6. According to an embodiment of the present invention, initially, each node 102, 104 performs NAT discovery using STUN protocol as shown in steps 202, 204 of FIG. 6. The first node 102 discovers that it is behind the first NAT 103 and its type is Symmetric. The second node 104 discovers that it is also behind the second NAT 105 and its type is, e.g., Port restricted-cone. Then, both nodes 102, 104 register themselves to the SIP proxy server 100 to join a network at steps 206, 208. This establishes signaling paths 116, 117 to the SIP proxy server 100 so that the SIP proxy server 100 can forward messages to the registered nodes 102, 104 through the paths 116, 117.

By way of example, the first node 102 now wishes to establish a peer-to-peer connection to the second node 104. The first node 102 allocates a local port 107 for the new peer-to-peer session. Then the first node 102 obtains an external port 112 by sending a binding request 118 from the local port 107 to the STUN server 101. Since the first node 102 knows that the first NAT 103 is present and is of type Symmetric, it performs port prediction at step 210 and constructs a list of transport addresses 107, 112, 113 and 114, and puts the list into a new INVITE message. Note that unlike prior art port prediction methods the first node 102 sends no information about the first NAT 103 and it is the first node 102 not the second node 104 that performs the port prediction. In addition, sending INVITE messages containing transport addresses is perfectly compatible with the existing ICE methodology.

At step 212, the first node 102 sends the INVITE message from a local port 106 with the list of transport addresses to a SIP proxy server 100 through the already established path 116. The SIP proxy server 100 finds in the message that the final destination is the second node 104 and forwards the INVITE message through the already establish path 117, and port 111 and finally the message reaches the second node 104 on local port 108. On reception of the INVITE, the second node 104 allocates a local port 109 for the future peer-to-peer session, and then the second node 104 obtains an external port 115 by sending a binding request 119 from the local port 109 to the STUN server 101.

Since the second node 104 knows that the second NAT 105 is not Symmetric, it puts the local port 109 and the external port 115 in a new provisional response message and sends it back to the first node 102 at step 214 via the SIP proxy server 100 through the same path 117, 116. The transmission of the provisional response terminates the transport exchange phase and starts connectivity check phase. Both nodes 102 and 104 start sending STUN packets from their local ports 107, 109 to check connectivity to the transport addresses obtained from the other node at steps 216, 218. When the first node 102 sends a STUN packet 120, the first NAT 103 allocates a new external port 113, and then the packet 120 reaches the external port 115 on the second NAT 105. The first few packets could be discarded at the external port 115 because the second NAT 105 is a port restricted cone NAT and the second node 104 might not yet have sent a packet from the local port 109 to the external port 113 on the first NAT 103. The second node 104 also sends STUN packets 121, 122, 123 to the obtained transport addresses 112, 113 and 114. The packet 121 reached at the port 112 is discarded because the first NAT 103 is a Symmetric NAT and the port 112 is exclusively allocated for the session to the STUN server 101. The STUN packet 123 reached at 114 is also discarded because there is no such external port allocated by the first NAT 103. The STUN packet 122 reached at 113 is forwarded by the first NAT 103 to the local port 107. The first node 102 then sends a response to the second node 104 and the second node 104 finds it has connectivity to the port 113 on the reception of the response. The STUN packet sent from the local port 107 on the first node 102 to the external port 115 on the second NAT 105 is eventually received at the local port 109 of second node 104. The second node 104 then sends a response back to the first node 102.

Upon reception of the response message, at step 220 the first node 102 sends an UPDATE message to the second node 104 via the SIP proxy server 100 to tell the second node 104 that the first node 102 found connectivity to the external port 115. This triggers the second node 104 to send a final response message to the first node 102 at step 222 to finalize the connection establishment process.

Instead of putting a NAT type in the message and having the second node 104 to make a prediction, the first node 102 makes a prediction and puts the predicted external ports 113, 114 along with the external port 112 obtained from STUN server 101, in the new INVITE message. Thus, the first node 102 provides no information about the first NAT 103 to the second node 104. Such use of ICE method completely eliminates complicated NAT combination logic for "break-out" packets as done in the prior art (US 2004/0139228). Instead, embodiments of the present invention can achieve the same result by performing a connectivity check that is essentially equivalent to the "break-out packet". Thus, embodiments of the invention allow a system that already uses ICE methodology to add Symmetric NAT traversal capability by simply adding the predicted transport addresses to the connectivity check list.

As described above, the first node 102, i.e., the node attempting to initiate communication with the second node 104 performs a port prediction and puts the predicted ports in the INVITE message. There are a number of techniques of performing the port prediction. For example, port prediction may be implemented using a port allocation rule discovery process using the following test. The first node 102 sends a STUN binding request to the STUN server 101 without any flags set in the CHANGE-REQUEST attribute and without the RESPONSE-ADDRESS attribute. This causes the STUN server 101 to send responses back to the address and port that the request came from. This test is applied to different combinations of IP addresses and ports in order to figure out the port allocation characteristics of the NAT 103. The STUN server 101 uses two different IP addresses, $C_a$ and $D_a$ and two different ports $C_P$ and $D_P$ as shown in Table III below.

TABLE III

|  | DESTINATTION | |
| --- | --- | --- |
|  | IP ADDRESS | PORT |
| TRY-1 | $D_A$ | $D_P$ |
| TRY-2 | $D_A$ | $C_P$ |
| TRY-3 | $C_A$ | $D_P$ |
| TRY-4 | $C_A$ | $C_P$ |

As can be seen from Table III, the test is performed four times (e.g., from TRY-1 to TRY-4) per local port in this example. All the tests must be done from the same local port. The first node 102 obtains four mapped addresses from the responses. These four mapped addresses are analyzed to determine the port allocation rule and delta-P value and to evaluation consistency. To look for consistency, the process can be performed multiple times, preferably using a different local port that does not have a NAT binding associated with it. The port allocation rule can be determined by looking at the port numbers obtained from the mapped addresses. If all port numbers are incremented for successive destinations having different port numbers, the port allocation rule is said to be "port sensitive". If the port increment size from successive destinations having the same IP address (e.g., from TRY-1 to TRY-2 and from TRY-3 to TRY-4) is always zero, but the incremental size from successive destinations having different IP addresses (e.g., TRY-2 to TRY-3) is not zero, the port allocation rule is said to be "address sensitive". If all port numbers of the obtained mapped addresses are the same, the NAT 103 is a 'Cone NAT'.

The delta-P value may be determined as follows. For address sensitive allocation, the delta-P value is equal to a port increment size between successive tries for which the destination port is different, e.g., for TRY-2 and TRY-3. The process may be repeated from another local port as shown in Table IV. In this example, TRY-1 through TRY-4 are as in TABLE III and TRY-5-TRY 8 continue the pattern destination IP addresses and port numbers of Table III.

TABLE IV

| TRY | MAPPED ADDRESS | Delta-P |
| --- | --- | --- |
| 1 | 67.105.12.10:49152 |  |
| 2 | 67.105.12.10:49152 | 0 |
| 3 | 67.105.12.10:49154 | 2 |
| 4 | 67.105.12.10:49154 | 0 |
| 5 | 67.105.12.10:49156 | 2 |
| 6 | 67.105.12.10:49156 | 0 |
| 7 | 67.105.12.10:49158 | 2 |
| 8 | 67.105.12.10:49158 | 0 |

Note that from Table IV it can be seen that where the destination IP address is the same for successive tries, the port numbers in the corresponding mapped addresses are the same. From this it can be determined that the port allocation rule is "address sensitive". Furthermore it can be seen that the value of delta-P is equal to the port increment between TRY-2 and TRY-3 and is also equal to the port increment sizes between TRY-4 and TRY-5 and between TRY-6 and TRY-7.

For port sensitive allocation, the value of delta-P is the difference between adjoining port numbers of mapped addresses obtained from testing TRY-[N+1] and TRY-[N]. In situations where the first node 102 cannot find consistency in the port increment size for delta p determination, the application include an algorithm to determine the delta p value based on statistical observation, or to decide to give up obtaining a valid delta p.

If the second NAT 105 is not symmetric, it is sufficient to perform port prediction, e.g., as part of the NAT discovery step 202 for the first node 102. In the case where the second NAT 105 is also a Symmetric NAT, the second node 104 may perform similar port prediction as part of its NAT discovery phase 204.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for peer-to-peer connection over a network between a first node behind a first network address translator (NAT) and a second node behind a second NAT, despite the first NAT and the second NAT intervening between the first and second nodes, wherein the first NAT is a Symmetric NAT, the method comprising the steps of:
performing a port prediction on the first NAT with the first node wherein the first node uses a port allocation rule discovery process to determine port allocation characteristics of the first NAT and constructs a list of predicted transport addresses on the first NAT according to the determined port allocation characteristics;
sending an INVITE message containing the list of predicted transport addresses from the first node to the second node, wherein the INVITE message does not contain a NAT type or NAT behavior information for the first NAT; and
performing a connectivity check using the predicted transport addresses by sending one or more STUN packets from the first node to one or more transport addresses provided by the second node in a provisional response to the INVITE message and receiving a STUN packet response from the second node at the first node, wherein the STUN packet response includes a transport address of an external port on the second NAT through which one of the STUN packets sent from the first node reached the second node.

2. The method of claim 1 wherein the second NAT is not a Symmetric NAT.

3. The method of claim 1, wherein the second NAT is a Symmetric NAT.

4. The method of claim 3, further comprising the step of performing a port prediction wherein the second node constructs a list of predicted transport addresses on the second NAT.

5. The method of claim 1, further comprising performing a NAT discovery before performing the port prediction, wherein during the NAT discovery the first node determines a type of the first NAT and the second node determines a type of the second NAT.

6. The method of claim 5 wherein performing NAT discovery includes the use of a STUN server.

7. The method of claim 1 wherein performing the connectivity check includes receiving STUN packets from the second node at the one or more transport addresses provided by the first node in the INVITE message.

8. The method of claim 7 wherein performing the connectivity check further includes sending a STUN packet response from the first node to the second node, wherein the STUN packet response includes a transport address of an external port on the first NAT through which one of the STUN packets sent from the second node reached the first node.

9. The method of claim 1 wherein the first and second nodes participate in an online game.

10. The method of claim 1, further comprising the step of exchanging data between the first and second nodes over one or more connection paths established by the connectivity check.

11. The method of claim 10 wherein exchanging the data is part of an online game.

12. The method of claim 10 wherein exchanging the data is part of an online chat session.

13. The method of claim 10 wherein the data is audio-visual (A/V) data.

14. The method of claim 1, wherein performing the port prediction includes the use of an Interactive Connectivity Establishment (ICE) methodology to construct the list of predicted transport addresses.

15. The method of claim 1 wherein the first node sends the INVITE message to the second node via a proxy server on a pubic network.

16. A first node operable for peer-to-peer connection over a network from behind a first network address translator (NAT) with a second node behind a second NAT, wherein the first NAT is a Symmetric NAT, wherein the first node includes a general purpose computer programmed with instructions for performing peer-to-peer communication over a network, the instructions including:
  an instruction for performing a port prediction on the first NAT with the first node wherein the first node uses a port allocation rule discovery process to determine port allocation characteristics of the first NAT and constructs a list of predicted transport addresses on the first NAT according to the determined port allocation characteristics;
  an instruction for sending an INVITE message with the list of predicted transport addresses to the second node, wherein the INVITE message does not contain a NAT type or NAT behavior information for the first NAT; and
  an instruction for checking for connectivity with the second node by sending one or more STUN packets from the first node to one or more transport addresses provided by the second node in a provisional response to the INVITE message and receiving a STUN packet response from the second node at the first node, wherein the STUN packet response includes a transport address of an external port on the second NAT through which one of the STUN packets sent from the first node reached the second node.

17. The first node of claim 16 wherein the first node is configured to send one or more STUN packets from the first node to one or more transport addresses provided by the second node in a provisional response to the INVITE message.

18. The first node of claim 16 wherein the first node is an online gaming module.

19. The first node of claim 16 wherein the first node is an A/V chat device, IP video camera, multimedia streaming device, or file sharing node.

20. The first node of claim 16 wherein the first node is a server host.

21. The first node of claim 16 wherein the first node is configured to send and receive signals to another peer via a proxy server on a pubic network prior to a peer-to-peer direct connection establishment with the second node.

22. A system for peer-to-peer connection, comprising
  a first node behind a first network address translator (NAT);
  a second node behind a second NAT, wherein the first and second nodes respectively include first and second general purpose computers programmed with instructions for performing peer-to-peer communication over a network, the instructions including:
  an instruction for performing a port prediction on the first NAT with the first node wherein the first node uses a port allocation rule discovery process to determine port allocation characteristics of the first NAT and constructs a list of predicted transport addresses on the first NAT according to the determined port allocation characteristics;
  an instruction for sending an INVITE message with the list of predicted transport addresses from the first node to the second node, wherein the INVITE message does not contain a NAT type or NAT behavior information for the first NAT; and
  an instruction for performing a connectivity check with the second node using the predicted transport addresses by sending one or more STUN packets from the first node to one or more transport addresses provided by the second node in a provisional response to the INVITE message and receiving a STUN packet response from the second node at the first node, wherein the STUN packet response includes a transport address of an external port on the second NAT through which one of the STUN packets sent from the first node reached the second node.

23. The system of claim 22 wherein the instructions further include an instruction for performing a connectivity check with the first node.

24. The system of claim 22 wherein the instruction for performing port prediction does not configure external port mapping of the first NAT.

25. A method for peer-to-peer connection over a network between a first node behind a first network address translator (NAT) and a second node behind a second NAT, despite the first NAT and the second NAT intervening between the first and second nodes, wherein the first NAT is a Symmetric NAT, the method comprising the steps of:
  performing a port prediction on the first NAT with the first node wherein the first node uses a port allocation rule discovery process to determine port allocation characteristics of the first NAT and constructs a list of predicted transport addresses on the first NAT according to the determined port allocation characteristics;
  sending an INVITE message containing the list of predicted transport addresses from the first node to the second node, wherein the INVITE message does not contain a NAT type or NAT behavior information for the first NAT; and
  performing a connectivity check using the predicted transport addresses by receiving STUN packets from the second node at the one or more transport addresses provided by the first node in the INVITE message and sending a STUN packet response from the first node to the second node, wherein the STUN packet response includes a transport address of an external port on the first NAT through which one of the STUN packets sent from the second node reached the first node.

26. The method of claim 25 wherein the second NAT is not a Symmetric NAT.

27. The method of claim 25, wherein the second NAT is a Symmetric NAT.

28. The method of claim 27, further comprising the step of performing a port prediction wherein the second node constructs a list of predicted transport addresses on the second NAT.

29. The method of claim 25, further comprising performing a NAT discovery before performing the port prediction, wherein during the NAT discovery the first node determines a type of the first NAT and the second node determines a type of the second NAT.

30. The method of claim 29 wherein performing NAT discovery includes the use of a STUN server.

31. The method of claim 25 wherein performing the connectivity check includes receiving STUN packets from the second node at the one or more transport addresses provided by the first node in the INVITE message.

32. The method of claim 31 wherein performing the connectivity check further includes sending a STUN packet response from the first node to the second node, wherein the STUN packet response includes a transport address of an external port on the first NAT through which one of the STUN packets sent from the second node reached the first node.

33. The method of claim 25 wherein the first and second nodes participate in an online game.

34. The method of claim 25, further comprising the step of exchanging data between the first and second nodes over one or more connection paths established by the connectivity check.

35. The method of claim 34 wherein exchanging the data is part of an online game.

36. The method of claim 34 wherein exchanging the data is part of an online chat session.

37. The method of claim 34 wherein the data is audio-visual (A/V) data.

38. The method of claim 25, wherein performing the port prediction includes the use of an Interactive Connectivity Establishment (ICE) methodology to construct the list of predicted transport addresses.

39. The method of claim 25 wherein the first node sends the INVITE message to the second node via a proxy server on a public network.

40. A first node operable for peer-to-peer connection over a network from behind a first network address translator (NAT) with a second node behind a second NAT, wherein the first NAT is a Symmetric NAT, wherein the first node includes a general purpose computer programmed with instructions for performing peer-to-peer communication over a network, the instructions including:

an instruction for performing a port prediction on the first NAT with the first node wherein the first node uses a port allocation rule discovery process to determine port allocation characteristics of the first NAT and constructs a list of predicted transport addresses on the first NAT according to the determined port allocation characteristics;

an instruction for sending an INVITE message with the list of predicted transport addresses to the second node, wherein the INVITE message does not contain a NAT type or NAT behavior information for the first NAT; and an instruction for checking for connectivity with the second node by receiving STUN packets from the second node at the one or more transport addresses provided by the first node in the INVITE message and sending a STUN packet response from the first node to the second node, wherein the STUN packet response includes a transport address of an external port on the first NAT through which one of the STUN packets sent from the second node reached the first node.

* * * * *